(12) United States Patent
Yamaguchi

(10) Patent No.: US 10,284,749 B2
(45) Date of Patent: May 7, 2019

(54) PRINTER, NON-TRANSITORY COMPUTER-READABLE STORAGE MEDIUM STORING PROGRAM FOR CREATING SCANNER PROFILE AND METHOD OF CREATING SCANNER PROFILE

(71) Applicant: KONICA MINOLTA, INC., Chiyoda-ku, Tokyo (JP)

(72) Inventor: Takeshi Yamaguchi, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 113 days.

(21) Appl. No.: 15/271,830

(22) Filed: Sep. 21, 2016

(65) Prior Publication Data
US 2017/0099414 A1    Apr. 6, 2017

(30) Foreign Application Priority Data

Oct. 1, 2015   (JP) ................................. 2015-195692

(51) Int. Cl.
G06F 15/00    (2006.01)
H04N 1/60     (2006.01)

(52) U.S. Cl.
CPC ......... H04N 1/6033 (2013.01); H04N 1/6008 (2013.01); H04N 1/6019 (2013.01);
(Continued)

(58) Field of Classification Search
CPC .. H04N 1/6033; H04N 1/6008; H04N 1/6019; H04N 1/6058; H04N 1/6061
(Continued)

(56) References Cited

U.S. PATENT DOCUMENTS 7,414,752 B2 *  8/2008  Adam ................ H04N 1/00068
                                              358/1.9
9,100,624 B2 *  8/2015  Matsuzaki ........... H04N 1/6033
(Continued)

FOREIGN PATENT DOCUMENTS

JP    2006033572 A    2/2006
JP    2007124242 A    5/2007
(Continued)

OTHER PUBLICATIONS

Japanese Office Action dated Sep. 12, 2017 issued in counterpart Japanese Application No. 2015-195692.

*Primary Examiner* — Mark R Milia
(74) *Attorney, Agent, or Firm* — Holtz, Holtz & Volek PC

(57) ABSTRACT

Provided are a printer, a non-transitory computer-readable storage medium and a scanner-profile creation method. In a printer including a print engine, a scanner and a color measurement device, or a printing system including a printer, a scanner and a color measurement device, a controller creates a scanner profile by using RGB values and color measurement values obtained by measuring a first color chart with the scanner and color measurement device, and determines a first color gamut and a second color gamut of the printer by using one or both of RGB values and color measurement values obtained by measuring the first color chart and a second color chart, respectively, where the second color chart includes at least color patches in specific colors representing a color gamut of the printer. The controller further corrects the scanner profile by comparing the first color gamut and the second color gamut.

20 Claims, 9 Drawing Sheets

(52) U.S. Cl.
 CPC ......... *H04N 1/6058* (2013.01); *H04N 1/6061*
  (2013.01); *H04N 2201/0094* (2013.01)
(58) Field of Classification Search
 USPC ........................................................ 358/518
 See application file for complete search history.

(56) References Cited

U.S. PATENT DOCUMENTS

2010/0086201 A1\* 4/2010 Muto ................... H04N 1/6033
  382/162
2014/0071504 A1\* 3/2014 Kuno ................ H04N 1/00015
  358/505

FOREIGN PATENT DOCUMENTS

JP  2009004865 A  1/2009
JP  2013207616 A  10/2013

\* cited by examiner

| INPUT | | | OUTPUT | | |
|---|---|---|---|---|---|
| R | G | B | L* | a* | b* |
| 20 | 21 | 23 | 10 | -1 | -2 |
| 21 | 22 | 46 | 17 | 2 | -5 |
| 23 | 24 | 69 | 20 | 8 | -20 |
| | ⋮ | | | ⋮ | |
| 30 | 41 | 228 | 26 | 23 | -49 |

FIG. 9A
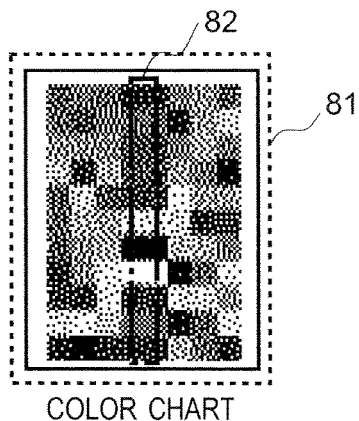
COLOR CHART
FIG. 9B
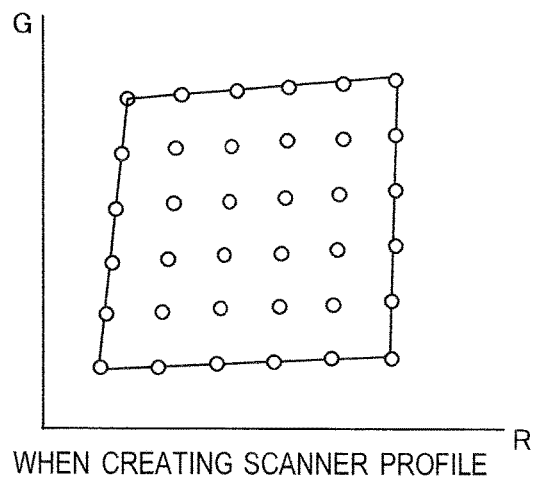
WHEN CREATING SCANNER PROFILE
○ LATTICE POINT OF SCANNER PROFILE
FIG. 9C
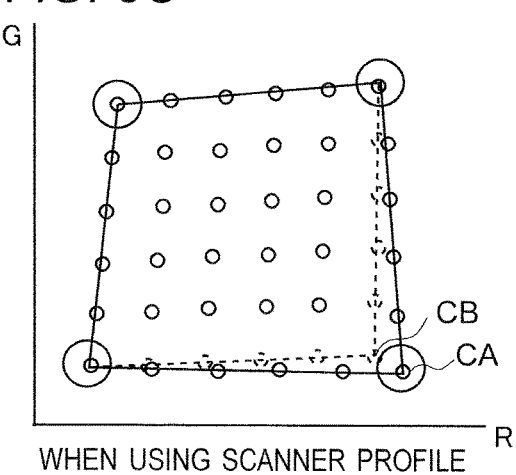
WHEN USING SCANNER PROFILE
○ LATTICE POINT OF SCANNER PROFILE (CORRECTED)
FIG. 10
RELATED ART
| INPUT | | | OUTPUT | | |
|---|---|---|---|---|---|
| R | G | B | L* | a* | b* |
| 0 | 0 | 0 | 5 | 0 | 0 |
| 0 | 0 | 17 | 11 | 3 | −12 |
| 0 | 0 | 34 | 13 | 12 | −19 |
| ⋮ | ⋮ | ⋮ | ⋮ | ⋮ | ⋮ |
| 0 | 0 | 255 | 40 | 70 | −80 |

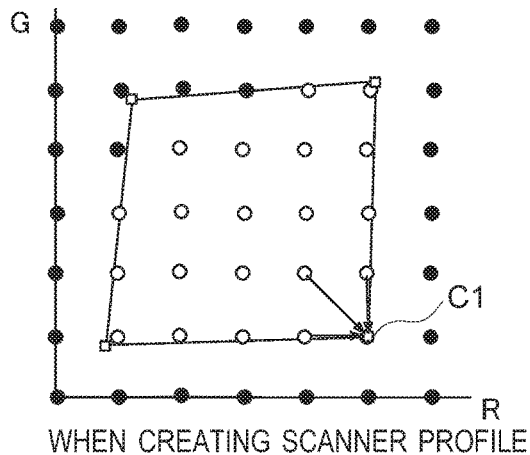

FIG. 11A
RELATED ART
WHEN CREATING SCANNER PROFILE

○ LATTICE POINT OF SCANNER PROFILE
  (INSIDE PRINTETR GAMUT)
● LATTICE POINT OF SCANNER PROFILE
  (OUTSIDE PRINTETR GAMUT)
▫ PRINTER GAMUT

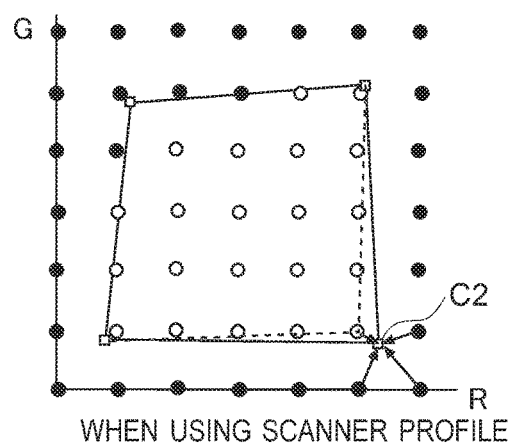

FIG. 11B
RELATED ART
WHEN USING SCANNER PROFILE

○ LATTICE POINT OF SCANNER PROFILE
  (INSIDE PRINTETR GAMUT)
● LATTICE POINT OF SCANNER PROFILE
  (OUTSIDE PRINTETR GAMUT)
▫ PRINTER GAMUT

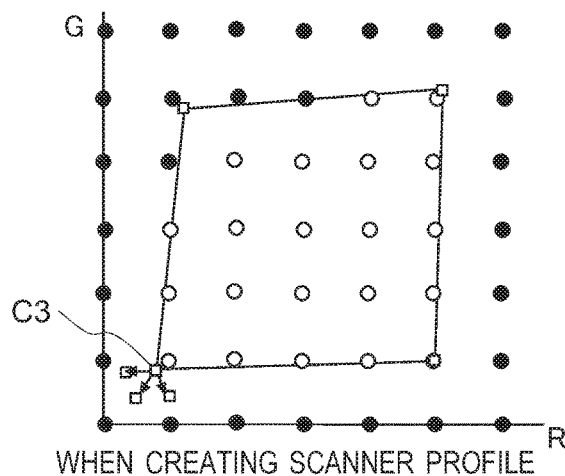

FIG. 12
RELATED ART
WHEN CREATING SCANNER PROFILE

○ LATTICE POINT OF SCANNER PROFILE (INSIDE PRINTETR GAMUT)
● LATTICE POINT OF SCANNER PROFILE (OUTSIDE PRINTETR GAMUT)
▫ PRINTER GAMUT

PRINTER, NON-TRANSITORY
COMPUTER-READABLE STORAGE
MEDIUM STORING PROGRAM FOR
CREATING SCANNER PROFILE AND
METHOD OF CREATING SCANNER
PROFILE

The entire disclosure of Japanese Patent Application No. 2015-195692 filed on Oct. 1, 2015 including description, claims, drawings, and abstract are incorporated herein by reference in its entirety.

TECHNICAL FIELD

The present invention is directed to printers, non-transitory computer-readable storage media each storing a program for creating a scanner profile and methods of creating a scanner profile. In particular, the present invention is directed to a printer including an in-line scanner and an in-line color measurement device, a non-transitory computer-readable storage medium storing a scanner-profile creating program for creating a color conversion table (a scanner profile), and a scanner-profile creating method for creating a color conversion table (a scanner profile).

BACKGROUND

Devices, such as a scanner and a printer, output device-dependent values (color values, like RGB values and CMYK values) which depend on the respective devices. To handle the device-dependent values, a color conversion table (a device profile) to convert device-dependent values into device-independent colors is created, and color conversion is performed on device-dependent values by using the device profile. As an example of a way to create a device profile, a description is now given of a way to create a scanner profile. To create a scanner profile, a color chart is output with a printer, and the color chart is measured with scanner and a color measurement device. RGB values obtained by the measurement of the color chart with the scanner and L*a*b* values in the CIE 1976 color space or XYZ values of the CIE 1931 color space obtained by the measurement of the color chart with the color measurement device are associated with each other, whereby a scanner profile can be created.

Since the above-mentioned scanner profile is created by measurement of a color chart printed with a printer, a change in the printer or printing conditions may affect an accuracy of color conversion using the scanner profile. That is, a change of the condition of the printer and/or a change of a paper type to be used in the printer may widen the color gamut of the printer (the range of colors that the printer can produce) in comparison with the color gamut of the printer at the time of creating the scanner profile. A use of the scanner profile under this situation can degrade of the accuracy of color conversion. In such a case, it is necessary to correct the scanner profile.

DESCRIPTION OF THE RELATED ART

As an example of a technique to correct a scanner profile, there is a method of recreating a scanner profile by using a commercial software program, which includes outputting a color chart with a printer again, and measuring the color chart with both the scanner and the color measurement device to recreate the scanner profile. With regard to another technique to correct a scanner profile in response to fluctuation of the scanner characteristics, Japanese Unexamined Patent Publication (JP-A) No. 2006-033572 discloses a technique to reduce a load of an image processing apparatus by causing a high-speed external device to perform calculation of a scanner profile.

Further, with regard to a technique to correct a printer profile, which is not a technique to correct a scanner profile, JP-A No. 2009-004865 discloses the following technique. A small number of color patches are measured with a color measurement device, to obtain a difference of measured L*a*b* values of each of the color patches between before and after fluctuation of the L*a*b* values which come from fluctuation of the printer after creation of a printer profile. Then, the printer profile is corrected so that the whole color conversion table for converting CMYK values into L*a*b* values, reflects the difference of the L*a*b* values.

To correct a scanner profile, the above-described technique using a commercial software program and the technique disclosed in JP-A No. 2006-033572 need a process to recreate the scanner profile from the beginning. Accordingly, these techniques need sufficient time to correct a scanner profile. These techniques further need, at each time when a scanner profile is corrected, a process of outputting a color chart for creating a scanner profile, which may waste time and/or resources.

JP-A No. 2009-004865 discloses a technique employing an algorithm which holds in the condition that input CMYK values are fixed. In a case where fluctuation of the characteristics of a printer is measured with a scanner, RGB values and L*a*b* values fluctuate together, and therefore, the disclosed technique is not suitable to be applied to correction of a scanner profile.

In a scanner profile, color measurement values (L*a*b* values, XYZ values, or other color values) are associated with RGB values prepared at fixed intervals to form a lattice. In a conventional scanner profile, the lattice address is fixed (the positions of lattice points are fixed). Therefore, even if the current color gamut of the printer can be determined by measurement of a color chart, it is difficult to make accurate judgement about fluctuation of the color gamut of the printer.

In other words, in conventional techniques, a scanner profile and a printer profile are created and corrected separately, and independently, and such a scanner profile does not reflect the color gamut of a printer. Accordingly, it is difficult in the conventional techniques to sense a change of the characteristics of a printer and to correct a scanner profile in accordance with the characteristics of a printer.

SUMMARY

The present invention is directed to printers, non-transitory computer-readable storage media each storing a program for creating a scanner profile and methods of creating a scanner profile.

A printer reflecting one aspect of the present invention is a printer comprising a print engine; an in-line scanner; an in-line color measurement device; and a controller. The controller causes the print engine to print a first color chart including a plurality of color patches and a second color chart including a plurality of color patches, where the plurality of color patches of the second color chart include color patches in specific colors representing a color gamut of the printer and being on an edge of the color gamut of the printer. The controller further causes the in-line scanner to obtain RGB values of color patches in the first color chart and the second color chart, and causes the in-line color measurement device to obtain color measurement values of color patches in the first color chart and the second color chart. The controller includes a scanner profile creation section that creates a scanner profile by associating the RGB values and the corresponding color measurement values of each of the color patches in the first color chart with each other. The controller further includes a printer gamut determination section that determines a first color gamut of the printer by using one or both of the RGB values and the color measurement values of the color patches in the first color chart and determines a second color gamut of the printer by using one or both of the RGB values and the color measurement values of the color patches in the specific colors in the second color chart. The controller further includes a scanner profile correction section that corrects the scanner profile by comparing the first color gamut and the second color gamut of the printer.

A non-transitory computer-readable storage medium reflecting one aspect of the present invention stores a program for creating a scanner profile. The program is to be executed in a device in a printing system including at least a printer, a scanner and a color measurement device. The device includes a controller that causes the printer to print a first color chart including a plurality of color patches and a second color chart including a plurality of color patches, where the plurality of color patches of the second color chart include color patches in specific colors representing a color gamut of the printer and being on an edge of the color gamut of the printer. The controller further causes the scanner to obtain RGB values of color patches in the first color chart and the second color chart, and causes the color measurement device to obtain color measurement values of color patches in the first color chart and the second color chart. The program, when being executed, causes the controller of the device to perform the following processing. The processing comprises creating a scanner profile by associating the RGB values and the corresponding color measurement values of each of the color patches in the first color chart with each other. The processing further comprises determining a first color gamut of the printer by using one or both of the RGB values and the color measurement values of the color patches in the first color chart; and determining a second color gamut of the printer by using one or both of the RGB values and the color measurement values of the color patches in the specific colors in the second color chart. The processing further comprises correcting the scanner profile by comparing the first color gamut and the second color gamut of the printer.

A method reflecting one aspect of the present invention is a method of creating a scanner profile in a printing system including at least a printer, a scanner, a color measurement device and a profile creation device. The method comprises printing, by the printer, a first color chart including a plurality of color patches; obtaining, by the scanner, RGB values of color patches in the first color chart by measuring colors of the color patches in the first color chart; and obtaining, by the color measurement device, color measurement values of color patches in the first color chart by measuring colors of the color patches in the first color chart. The method further comprises creating, by the profile creation device, a scanner profile by associating the RGB values and the corresponding color measurement values of each of the color patches in the first color chart with each other; and determining, by the profile creation device, a first color gamut of the printer by using one or both of the RGB values and the color measurement values of the color patches in the first color chart. The method further comprises printing, by the printer, a second color chart including a plurality of color patches, where the plurality of color patches of the second color chart include color patches in specific colors representing a color gamut of the printer and being on an edge of the color gamut of the printer. The method further comprises obtaining, by the scanner, RGB values of color patches in the second color chart by measuring colors of the color patches in the second color chart; and obtaining, by the color measurement device, color measurement values of at least the color patches in the specific colors in the second color chart by measuring colors of the at least the color patches in the specific colors in the second color chart. The method further comprises determining, by the profile creation device, a second color gamut of the printer by using one or both of the RGB values and the color measurement values of the color patches in the specific colors in the second color chart. The method further comprises correcting, by the profile creation device, the scanner profile by comparing the first color gamut and the second color gamut of the printer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIGS. 9A, 9B, and 9C are schematic diagrams illustrating a method of creating and correcting a scanner profile according to one embodiment of the present invention;

FIG. 10 illustrates an example of a conventional color conversion table;

FIGS. 11A and 11B are schematic diagrams illustrating a conventional scanner profile; and FIG. 12 is a schematic diagram illustrating a conventional scanner profile.

DESCRIPTION OF THE PREFERRED EMBODIMENTS

Figure 1:
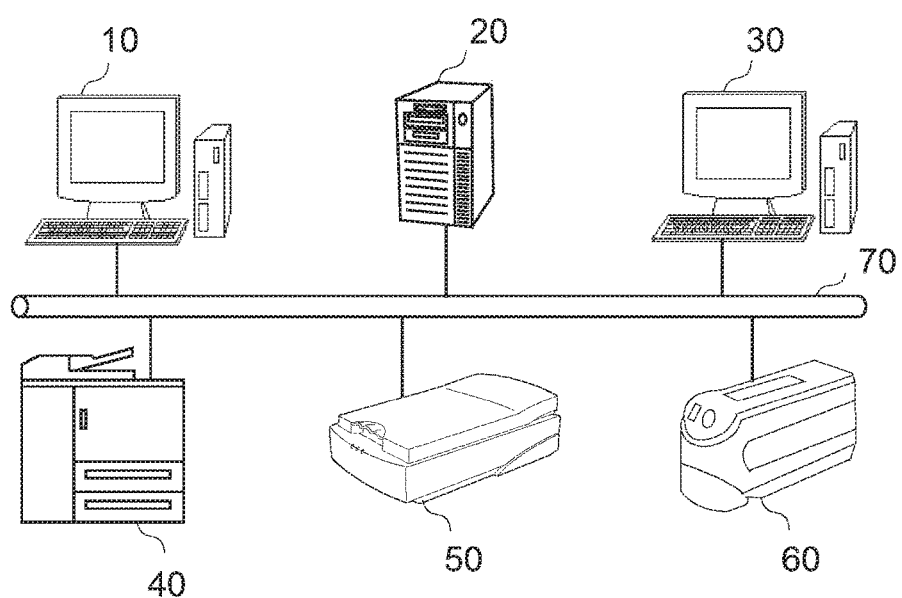
FIG. 1 is a schematic diagram illustrating an example of the structure of a printing system according to one embodiment of the present invention.

Hereinafter, an embodiment of the present invention will be described with reference to the drawings. However, the scope of the invention is not limited to the illustrated examples.

With printers, non-transitory computer-readable storage media each storing a program for creating a scanner profile and methods of creating a scanner profile, as embodiments of the present invention, a scanner profile can be created properly in accordance with the characteristics (color gamut) of a printer and a scanner profile can be corrected properly in accordance with a change of the characteristics (color gamut) of a printer, for the following reasons.

That is, a scanner profile can be created and corrected properly by the following processes. A first color chart is printed with a printer, a scanner obtains RGB values of color patches in the first color chart, and a color measurement device obtains color measurement values of color patches in the first color chart. A controller of the printer or of a device for creating a scanner profile then creates a scanner profile by associating the RGB values and the corresponding color measurement values of each of the color patches in the first color chart with each other. After that, a second color chart is printed with the printer, where a plurality of color patches of the second color chart include color patches in specific colors representing a color gamut of the printer and being on an edge of the color gamut of the printer. The scanner obtains RGB values of color patches in the second color chart, and the color measurement device obtains color measurement values of color patches in the second color chart. The controller then determines a first color gamut of the printer by using one or both of the RGB values and the color measurement values of the color patches in the first color chart and determines a second color gamut of the printer by using one or both of the RGB values and the color measurement values of the color patches in the specific colors in the second color chart. The controller corrects the scanner profile by comparing the first color gamut and the second color gamut of the printer.

As described in the section of BACKGROUND, in the case of using a device, such as a scanner and a printer, color conversion is performed by using a color conversion table (a device profile) for converting device-dependent values (color values) output by the device into device-independent colors. In such a color conversion table, for example, plural sets of values of R, G, and B (RGB values) which change with fixed intervals and corresponding sets of values of L*, a*, and b* (L*a*b* values) are written as illustrated in FIG. 10 (please see INPUT and OUTPUT in the table shown in FIG. 10). In the example illustrated in FIG. 10, the B values are changed with fixed intervals.

When a printer has a wider color gamut in comparison with the color gamut of the printer at the time of creating a scanner profile because of a change of the condition of the printer and/or a change of a paper type to be used for printing, it can degrade accuracy of color conversion which uses the scanner profile. A description is given to this matter with reference to FIGS. 11A and 11B. Each of FIGS. 11A and 11B is a diagram in which the color gamut of a printer (indicated with solid lines connecting white squares in FIGS. 11A and 11B) is superimposed on a lattice of RGB values (in this example, RG values) prepared with fixed intervals (in other words, RGB values on lattice points prepared with fixed intervals). In FIGS. 11A and 11B, lattice points inside the color gamut are indicated with white circles and lattice points outside the color gamut are indicated with black circles. The color gamut in the figures is obtained on the basis of measurement values which were obtained by measurement of color patches in a color chart. FIG. 11A illustrates an example of the lattice points and the color gamut at a time of creating a scanner profile and FIG. 11B illustrates an example of those on using the scanner profile. In the example FIG. 11A, the color C1 at the bottom right corner of the edge (the boundary) of the color gamut of the printer can be calculated by using RG values with high accuracy on three lattice points inside the color gamut. Therefore, color conversion can be performed with maintaining high accuracy. On the other hand, a change of the condition of a printer and/or a change of paper type to be used for printing may change the color gamut of the printer as illustrated in FIG. 11B. In this figure, the printer has the wider printer gamut (the bottom right part of the color gamut has expanded as indicated with solid lines in FIG. 11B) in comparison with the color gamut at the time of creating the scanner profile (the color gamut indicated with broken lines in FIG. 11B). In this condition, the color C2 at the bottom right corner of the edge of the color gamut of the printer should be calculated by using RG values with less accuracy, which are on three lattice points outside the color gamut and obtained by using extrapolation calculation. It degrades the accuracy of the color conversion.

Further, in a conventional scanner profile, color measurement values (for example, L**a*b* values, XYZ values, or other color values) are associated with RGB values prepared at fixed intervals. Therefore, even if the current color gamut of a printer can be determined by measurement of a color chart, it is difficult to judge accurately whether the color gamut of the printer has been changed. In an example of the color gamut of a printer (indicated with solid lines connecting white squares) illustrated in FIG. 12, it is possible to judge whether each of lattice points (please see white circles and black circles in FIG. 12) is inside (or outside) the color gamut of a printer. On the other hand, when the color gamut of the printer (for example, the color C3 on the bottom left corner of the edge of the color gamut of the printer in FIG. 12) has changed between lattice points, it is difficult to sense the change because the scanner profile includes no information about the space between the lattice points.

In view of that, an embodiment of the present invention provides a printer including a print engine, an in-line scanner and an in-line color measurement device, or a device (which is a device configured to create a scanner profile, for example, a printer or a profile creation device) in a printing system which includes a printer, a scanner and color measurement device. The printer or the device is configured to perform the following processing.

First, a first color chart example, a color chart for creating a scanner profile) in which plural color patches are arranged is printed by the printer (print engine), and both the scanner (in-line scanner) and the color measurement device (in-line color measurement device) measure colors of the color patches in the first color chart to obtain RGB values and color measurement values of the color patches. Then, a controller of the printer or the device configured to create a scanner profile, creates a scanner profile by associating the RGB values and the corresponding color value of each of the color patches of the first color chart with each other. In this process, by using the RGB values and the color measurement values of the color patches in the first color chart, the controller may create a scanner profile, for example, in which RGB values and corresponding color measurement values, which indicate each of colors inside a color gamut of the printer and colors on an edge of the color gamut, are associated with each other, so as to give more accurate information of the color gamut of the printer to the scanner profile. Next, a second color chart is printed by the printer (print engine), and in the second color chart, there are arranged at least color patches in colors (referred to as specific colors) on an edge of the color gamut of the printer, which represents the color gamut of the printer, in other words, colors which are on the boundary of the color gamut of the printer and represent the characteristics of the color gamut of the printer. The second color chart may be a color chart for one of calibration of the printer, creating a printer profile of the printer and color verification, a part of which includes at least color patches in the specific colors. The scanner (in-line scanner) further measures colors of the color patches in the second color chart to obtain RGB values of the color patches, and the color measurement device (in-line color measurement device) measures colors of at least the color patches in the specific colors in the second color chart to obtain color measurement values of the color patches. Then, the controller of the printer or the device configured to create a scanner profile, determines a first color gamut of the printer by using one or both of the RGB values and the color measurement values of the color patches in the first color chart and determines a second color gamut of the printer by using one or both of the RGB values and the color measurement values of the color patches in the specific colors in the second color chart. The controller then corrects the scanner profile on a basis of a result of comparison of the first color gamut and the second color gamut of the printer. In this process, the controller may judge fluctuation of the color gamut of the printer, and may correct the scanner profile, on judging that the printer has a wider color gamut in comparison with the color gamut at the time of creating the scanner profile (in other words, on determining that one or both of the RGB values and the color measurement values of a color patch in one of the specific colors are outside the first color gamut). In the process of correcting the scanner profile, the controller may correct the scanner profile, for example, by changing the RGB values and the corresponding color measurement values in the scanner profile, which indicate a color closest to the one of the specific colors among colors on an edge of the first color gamut, to the RGB values and the color measurement values of the color patch of the one of the specific colors. Alternatively, the controller may correct the scanner profile by adding, to the scanner profile, the RGB values and the color measurement values of the color patch of the one of the specific colors with being associated with each other, as RGB values and corresponding color measurement values which indicate a color on an edge of the second color gamut.

Figures 7, 8:
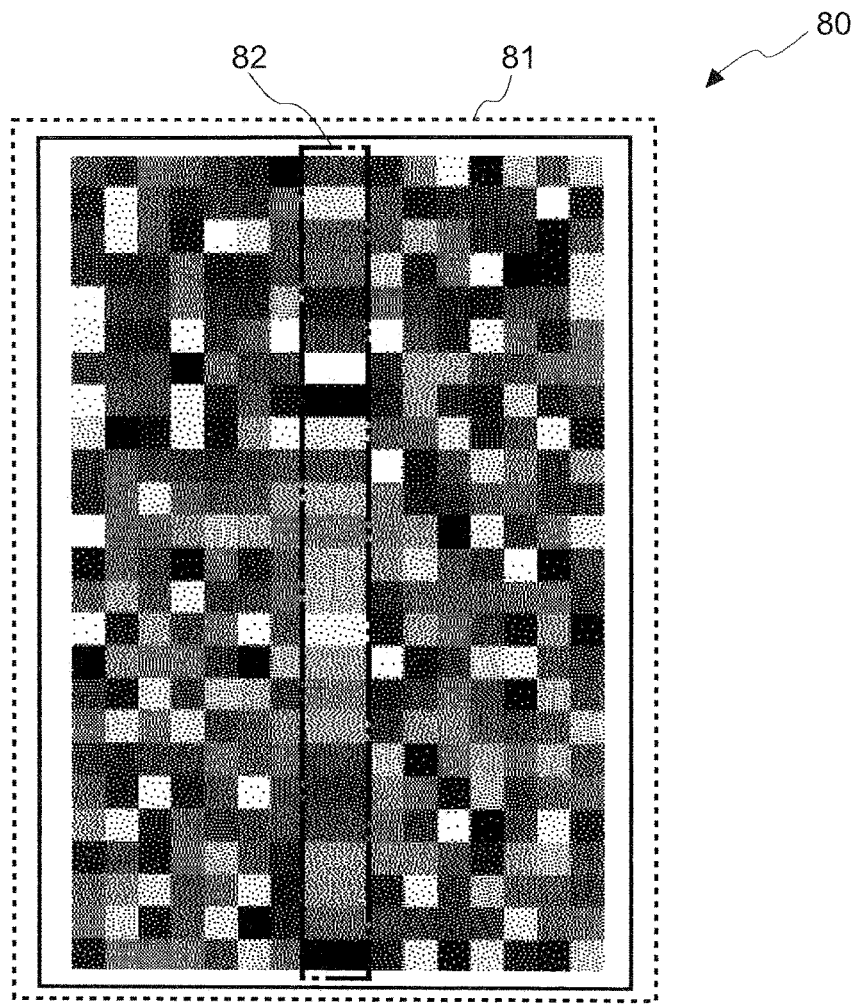
FIG. 7 illustrates an example of a color chart according to one embodiment of the present invention.
FIG. 8 illustrates an example of a color conversion table according to one embodiment of the present invention.

Herein, a description is given of a concrete example of the embodiment employing a printer which includes a print engine, an in-line scanner and an in-line color measurement device, with reference to FIG. 8 and FIGS. 9A to 9C. As advance preparations, the controller of the printer performs the following processing (1), which includes creating a color conversion table (scanner profile) as illustrated in FIG. 8 and determining the color gamut of the printer in the scanner profile. In concrete terms, the controller of the printer creates a color conversion, table while preparing RGB values at variable locations in the color conversion table (in other words, variable locations of lattice points in the RGB color space) so that the table includes both RGB values and color measurement values indicating each of colors representing the color gamut of the printer and being on the edge of the color gamut (that is, so as to put lattice points on the edge of the color gamut of the printer). The controller then determines the color gamut of the printer in the scanner profile (please see solid lines in FIG. 9B). These processes can be performed easily if the color chart are measured with the in-line scanner and the in-line color measurement device in the printer to obtain RGB values and color measurement values of each color patch in a color chart. Next, the controller of the printer performs the following processing (2), on performing color conversion by using the scanner profile. The controller causes the in-line scanner and the in-line color measurement device to measure color patches in a color chart (please see FIG. 9A) as a target of color conversion and determines the color gamut of the printer at the moment. In concrete terms, the in-line scanner measures color patches in a scanner reading region 81 of the color chart (FIG. 9A) as a target of color conversion, and the in-line color measurement device measures a part of the color chart, which is a part where color patches in the specific colors indicating colors on the edge of the color gamut of the printer are arranged (please see a color-measurement-device reading region 82 which runs through the center of the color chart in FIG. 9A and extends in the longitudinal direction of the color chart). By using the measurements result, the controller determines the color gamut of the printer at that moment (please see solid lines in FIG. 9C). After the processing, on judging that the color gamut (solid lines in FIG. 9C) of the printer determined in the processing (2) is wider or greater than the color gamut (broken lines in FIG. 9C) of the printer determined in the processing (1), the controller corrects the scanner profile so as to put lattice points in the scanner profile on the edge of the color gamut of the printer determined in the processing (2). It should be noted that there is no need to make the lattice out of orthogonal lattice lines and that there is no need to locate the lattice liens at fixed intervals.

The above-described operations can realize color conversion with high accuracy without extrapolation calculation even if a printer has a wider color gamut in comparison with that at the time of creating the scanner profile because of fluctuation of the condition of the printer. Further, the above-described operations allow to judge the fluctuation of the condition of the printer at each time of using the scanner profile, and therefore do not need a process to output a color chart to be used for checking the condition of the printer. It can reduce waste of resources and time. Further, the scanner profile includes variable RGB values, which allows accurate determination of the size of the color gamut of a printer. Furthermore, a scanner profile tends to expand in the direction in which the color gamut of the printer becomes large, and a repeated use of a scanner profile makes the scanner profile support a wider color gamut, which enhances the robustness of color conversion.

Herein, in this specification, a profile means a color conversion table. Among various profiles, the ICC (International Color Consortium) profile has been widely used not only in the printing industry but also in the IT industry, and serves as a de facto standard substantially. In the ICC profile, input values in a correspondence table are defined on the basis of the lattice number. In an example that values of each of R, G and B values are represented by values in the range from 0 to 255 and the lattice number is set to six, the intervals of the input values are defined by dividing 255 by 5 (the lattice number minus one). Accordingly, each of the RGB values has any one of values of 0, 51, 102, 153, 204, and 255, and the conversion table includes $6^3$ (the cube of six) sets of input RGB values and corresponding sets of color measurement values.

EXAMPLES

Figure 2A:
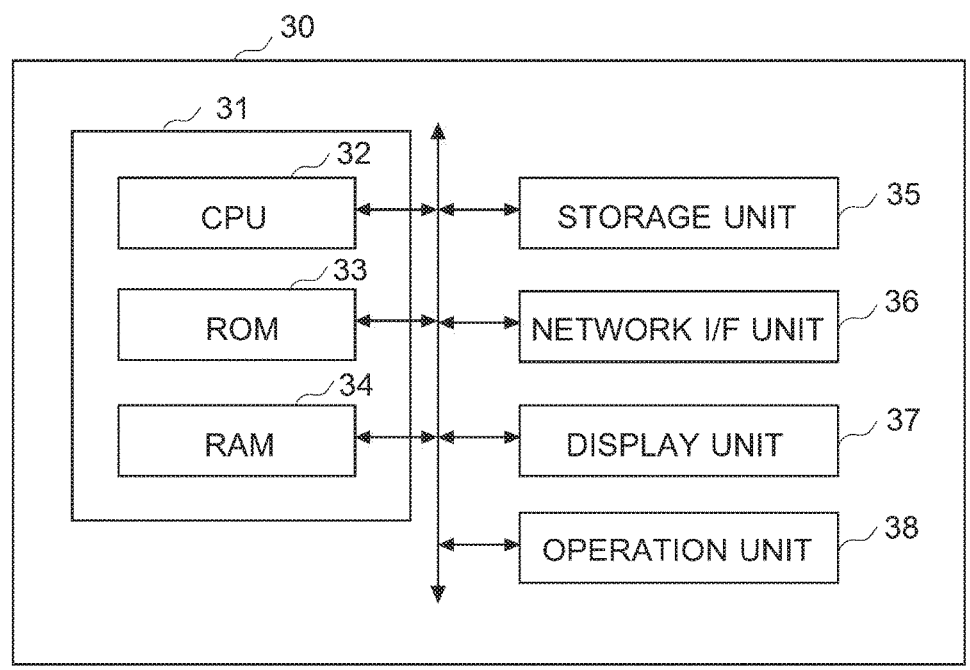
FIGS. 2A and 2B are block diagrams illustrating an example of the structure of a profile creation device according to one embodiment of the present invention.
Figure 2B:
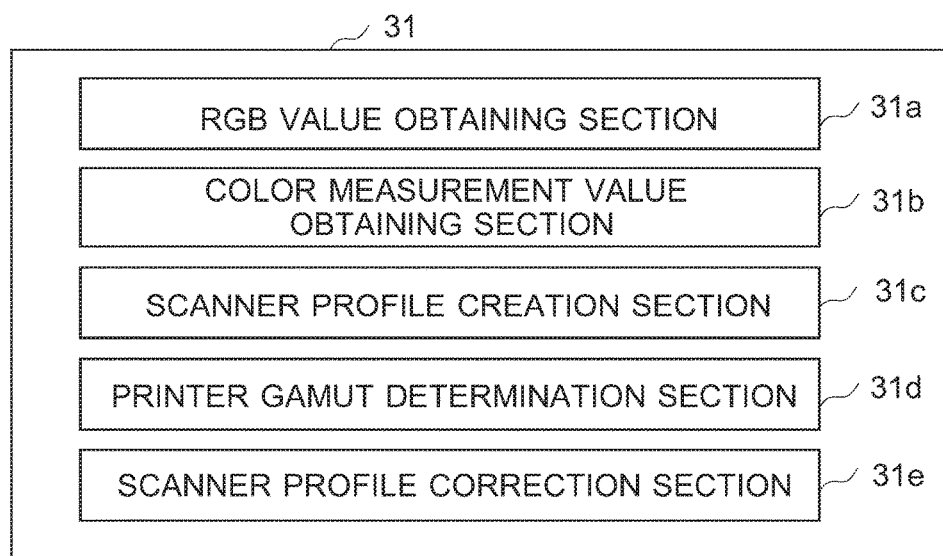
Figure 3:
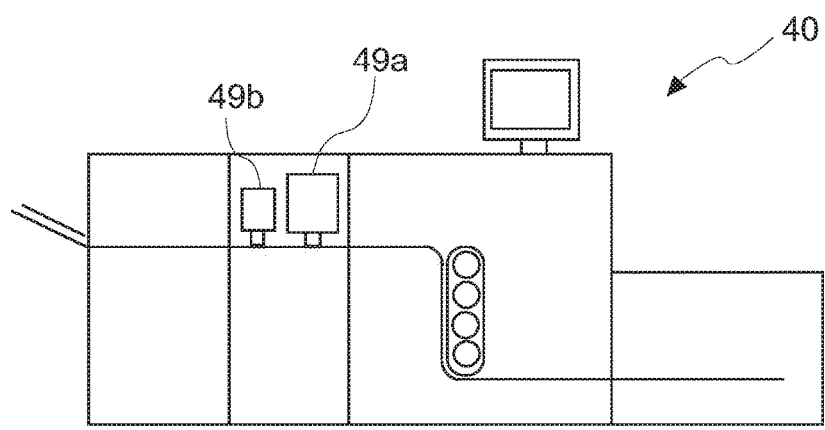
FIG. 3 is a schematic diagram illustrating an example of the structure of a printer (an example that the printer includes a scanner and a color measurement device) according to one embodiment of the present invention.
Figure 4A:
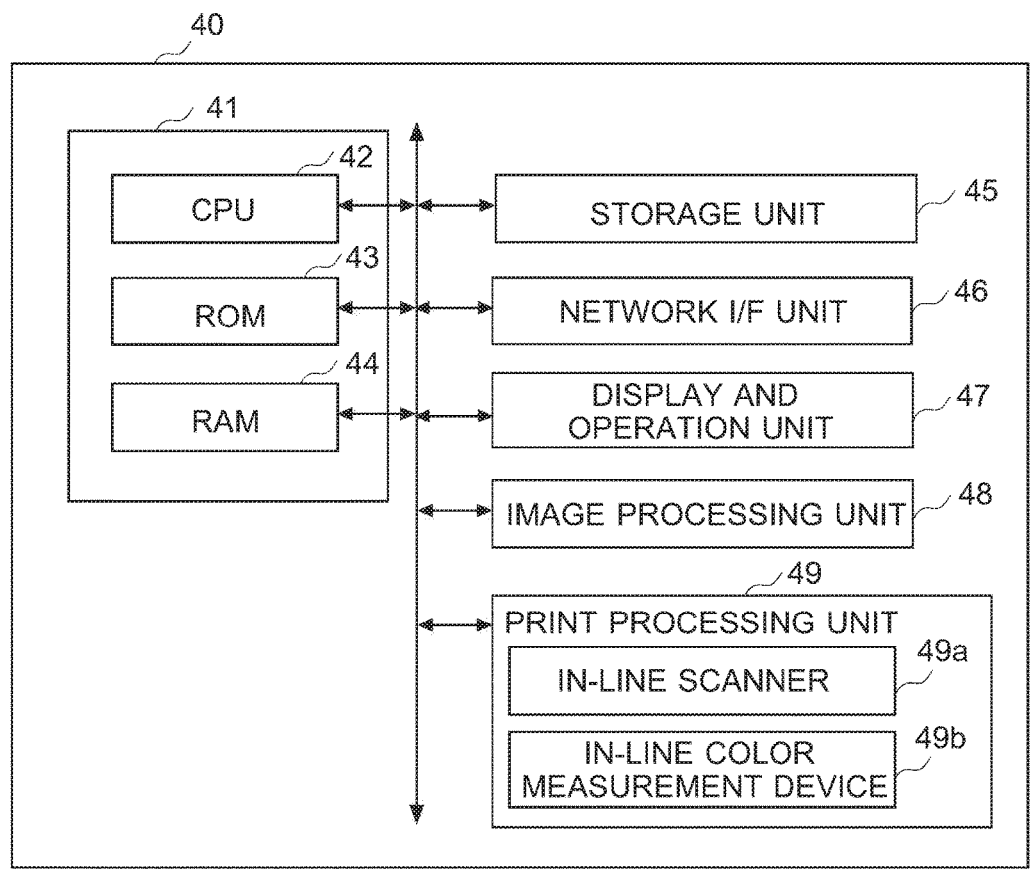
FIGS. 4A and 4B are block diagrams illustrating examples of the structure of a printer (an example that the printer includes a scanner and a color measurement device and an example that the printer further includes a control unit having functions of a profile creation device) according to one embodiment of the present invention.
Figure 4B:
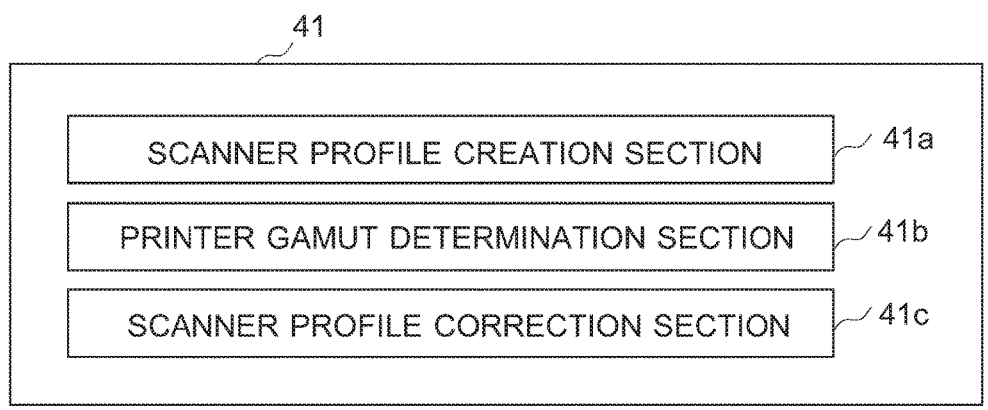
Figure 5:
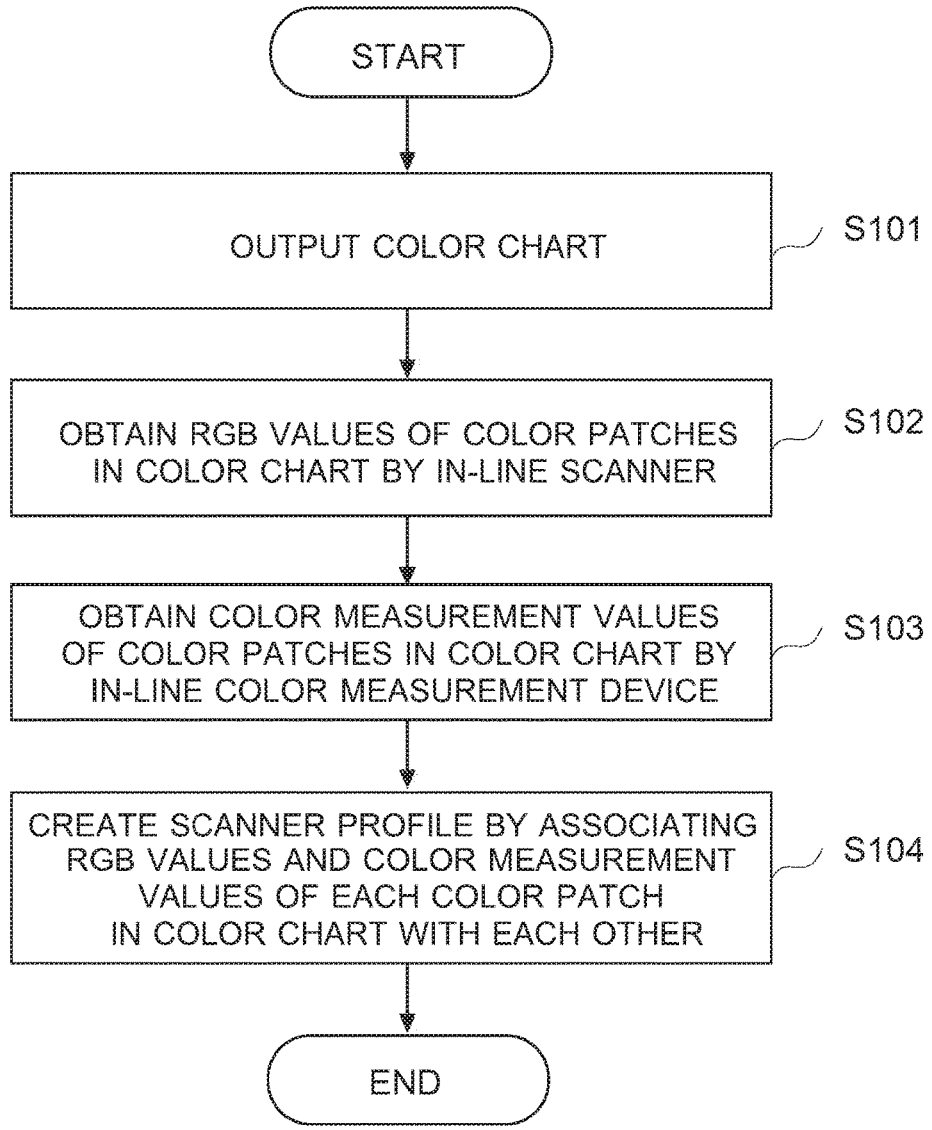
FIG. 5 is a flowchart illustrating an example of operations (on creating a scanner profile) of a printer having functions of a profile creation device according to one embodiment of the present invention.
Figure 6:
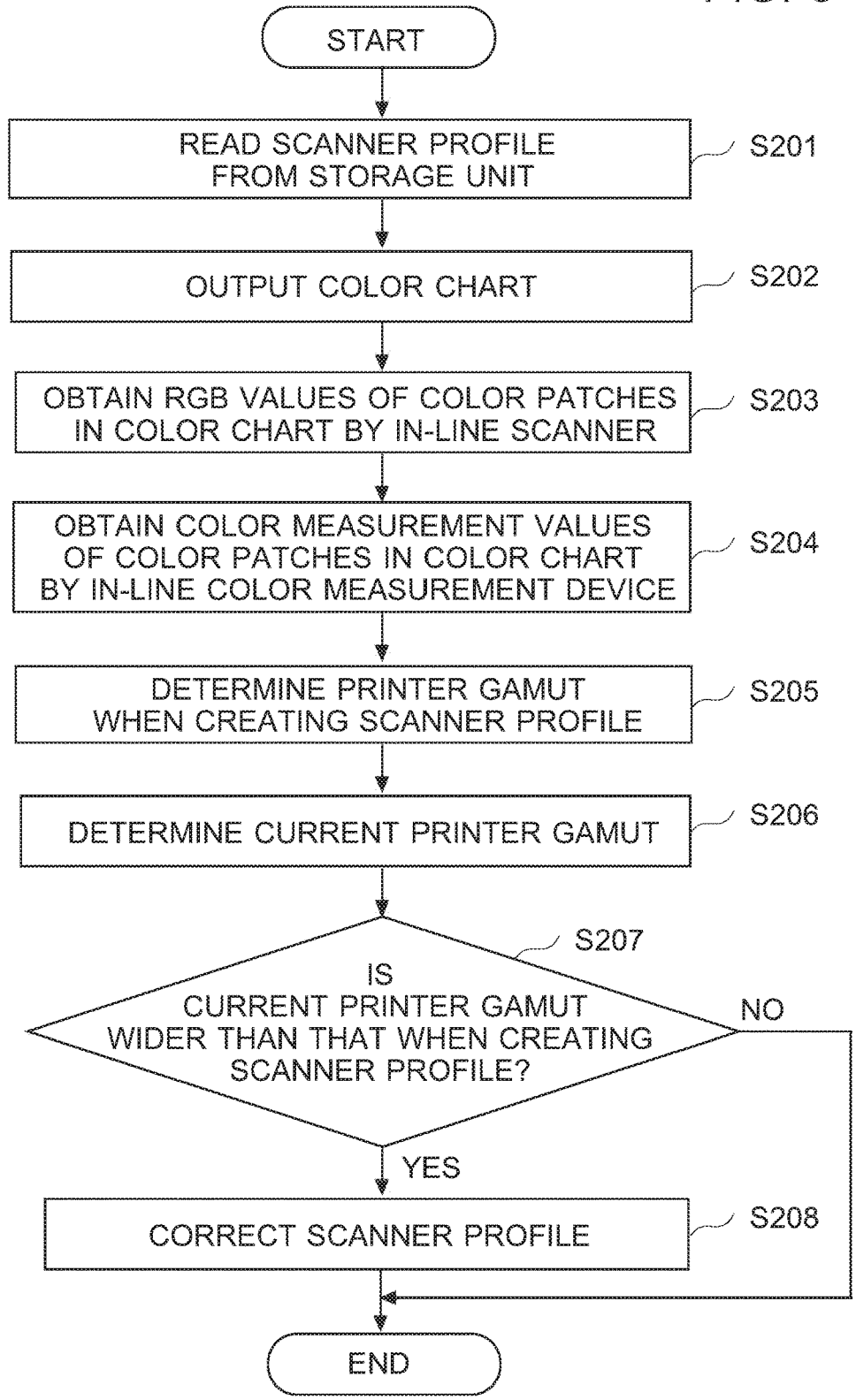
FIG. 6 is a flowchart illustrating an example of operations (on correcting a scanner profile) of the printer having functions of a profile creation device according to one embodiment of the present invention.

In order to describe the above-mentioned embodiment of the present invention in more detail, with reference to FIG. 1 to FIG. 9C, a description will be given to an example of a printer, a non-transitory computer-readable storage medium storing a program for creating a scanner profile and a method of creating a scanner profile. FIG. 1 is a schematic diagram illustrating an example of the structure of a printing system of the present example. FIGS. 2A and 2B are block diagrams illustrating an example of the structure of a profile creation device of the present example. FIG. 3 is a schematic diagram illustrating an example of the structure of a printer (an example that the printer includes a scanner and a color measurement device) of the present example. FIG. 4A is a block diagram illustrating an example of the structure of the printer (the printer including a scanner and a color measurement device), and FIG. 4B is a block diagram illustrating an example of the structure of the printer (the printer further including a control unit having functions of a profile creation device. Each of FIG. 5 and FIG. 6 is a flowchart illustrating an example of operations of a printer having functions of a profile creation device of the present example. FIG. 7 illustrates a color chart of the present example, and FIG. 8 illustrates a color conversion table of the present example. FIGS. 9A, 9B, and 9C are schematic diagrams for illustrating a method of creating and correcting a scanner profile of the present example.

As illustrated in FIG. 1, a printing system of the present example includes an output instruction terminal 10, a controller 20, a profile creation device 30, a printer 40, a scanner 50, a color measurement device 60, and so on. The above devices are connected to each other via a communication network 70, where examples of the communication network 70 include a LAN (Local Area Network) and WAN (Wide Area Network) defined by specifications, such as Ethernet, Token Ring and FDDI (Fiber-Distributed Data Interface). The controller 20 and printer 40 may be communicably connected to each other with an exclusive line supporting, for example, PCI (Peripheral Component Interconnect) communication.

The output instruction terminal 10 is a computing device as a client, and is configured to issue a job to give a printing instruction to the controller 20 through a printer driver or a software program for exclusive use.

The controller 20 is configured to perform image processing, which includes color conversion, screening and rasterizing, on a job issued by the output instruction terminal 10, and transfer image data obtained after the image processing, to the printer 40. The above color conversion is performed by using a scanner profile or a printer profile created by the profile creation device 30.

The profile creation device 30 is configured to create a scanner profile and a printer profile by using a color chart output from the printer 40. The detailed constitution of the profile creation device 30 will be described later.

The printer 40 receives image data from the controller 20, forms an image based on the image data on a paper sheet, and outputs the paper sheet. The detailed constitution of the printer 40 will be also described later.

The scanner 50 includes three kinds of sensors, for example, for colors of R, G and B, and is configured to scan a color chart output from the printer 40 and to output RGB values.

The color measurement device 60 is a color measurement device supporting spectrophotometry (spectrophotometer) capable of measuring the light intensity at each wavelength. The color measurement device 60 is configured to measure colors of a color chart output from the printer 40 and to output color measurement values (for example, L*a*b* values, XYZ values, or other color values).

Herein, FIG. 1 illustrates an example of the printing system of the present example, and its constitution can be modified appropriately. For example, the controller 20 may be constituted to be incorporated in the printer 40, the profile creation device 30 may be constituted to be incorporated in the controller 20 or the printer 40, or the scanner 50 and/or the color measurement device 60 may be constituted to be incorporated in the printer 40. Hereinafter, the profile creation device 30 and the printer 40 will be described in detail.

Profile Creation Device:

As illustrated in FIG. 2A, the profile creation device 30 includes a control unit 31 (a controller of the profile creation device), a storage unit 35, a network interface (I/F) unit 36, a display unit 37, an operation unit 38, and so on.

The control unit 31 includes a CPU (Central Processing Unit) and memories including ROM (Read Only Memory) 33 and RAM (Random Access Memory) 34. The CPU 32 reads out control programs stored in ROM 33 or storage unit 35, loads the programs onto RAM 34, and executes the programs, thereby performing the whole operations of profile creation device 30.

The storage unit 35 includes a HDD (Hard Disk Drive) and/or a SSD (Solid State Drive). The storage unit 35 stores programs which, when being executed, cause the CPU 32 to control various sections of the profile creation device 30; information about operations and functions of the profile creation device 30; scanner profiles having been created or corrected, and the like.

The network interface unit 36 includes a NIC (Network Interface Card) and/or a modem. The network interface unit 36 connects the profile creation device 30 to communication network 70 so as to be communicable with the controller 20, the printer 40, the scanner 50, and the color measurement device 60.

The display unit 37 includes a display, for example, a LCD (Liquid Crystal Display an organic EL (Electro-Luminescence) display, so as to display various kinds of screens with regard to creation and correction of scanner profiles.

The operation unit 38 includes a device, for example, a mouse and/or a keyboard, and allows an operator to perform various operations with regard to creation and correction of scanner profiles.

As illustrated in FIG. 2B, the control unit 31 is configured to work as an RGB value obtaining section 31a, a color measurement value obtaining section 31b, a scanner profile creation section 31c, a printer gamut determination section 31d, and a scanner profile correction section 31e.

At the time of creating a scanner profile, the RGB value obtaining section 31a obtains RGB values of color patches in of a color chart (a first color chart) from the scanner 50 (or an in-line scanner 49a of the printer 40 which will be described later). At the time of using the scanner profile (at the time of color conversion by using the scanner profile), the RGB value obtaining section 31a obtains RGB values of color patches (at least color patches in specific colors which represent the color gamut of the printer and are on the edge of the color gamut) in another color chart (a second color chart) from the scanner 50 (or the in-line scanner 49*a*).

At the time of creating the scanner profile, the color measurement value obtaining section 31*b* obtains color measurement values of color patches in the color chart (the first color chart) from the color measurement device 60 (or an in-line color measurement device 49*b* of the printer 40 which will be described later). At the time of using the scanner profile (at the time of color conversion by using the scanner profile), the color measurement value obtaining section 31*b* obtains color measurement values of color patches in the another color chart (second color chart) from the color measurement device 60 (or the in-line color measurement device 49*b*), where the color patches to be measured includes at least the color patches in the specific colors which represent the color gamut of the printer and are on the edge of the color gamut arranged in a specific part of the color chart (second color chart), for example, a region running through the center of the color chart in the longitudinal or width direction.

The scanner profile creation section 31*c* creates a scanner profile which associates RGB values obtained by the RGB value obtaining section 31*a* at the time of creating the scanner profile and corresponding color measurement values obtained by the color measurement value obtaining section 31*b* at the time of creating the scanner profile (that is, a scanner profile which converts the RGB values into the color measurement values). In this process, by using the RGB values and the color measurement values obtained, the scanner profile creation section 31*c* creates the scanner profile by associating RGB values and corresponding color measurement values inside or on the edge of the color gamut of the printer (RGB values and corresponding color measurement values indicating each of colors inside of the color gamut of the printer and colors on the edge of the color gamut).

The printer gamut determination section 31*d* determines the color gamut (referred to as a first color gamut) of the printer by using one or both of the RGB values and the color measurement values of the color patches in the color chart (the first color chart) printed at the time of creating the scanner profile. Further, the printer gamut determination section 31*d* determines another color gamut (referred to as a second color gamut) of the printer by using one or both of the RGB values and the color measurement values of the color patches in the specific colors, which represent the color gamut of the printer and are on the edge of the color gamut, in the color chart (the second color chart) printed at the time of using the scanner profile (at the time of color conversion by using the scanner profile).

The scanner profile correction section 31*e* compares the color gamut (the first color gamut) of the printer at the time of creating the scanner profile with the color gamut (the second color gamut) of the printer at the time of using the scanner profile, and determines the necessity of correction of the scanner profile on the basis of the comparison result. In concrete terms, on determining that the printer has the color gamut wider than the color gamut at the time of creating the scanner profile (for example, on determining that one or both of the RGB values and the color measurement values of the color patch in one of the specific colors are outside the first color gamut) the scanner profile correction section 31*e* determines such that it is necessary to correct the scanner profile. Then, the scanner profile correction section 31*e* corrects the scanner profile on the basis of the color gamut of the printer at the time of using the scanner profile. For example, the scanner profile correction section 31*e* may re-establish at least a part of the lattice points, on which RGB values and corresponding color measurement values are associated with each other, in the scanner profile so as to be put on the edge of the color gamut of the printer at the time of using the scanner profile (in other words, changes the RGB values and the corresponding color measurement values in the scanner profile, indicating a color closest to the one of the specific colors among colors on an edge of the first color gamut, to the RGB values and the color measurement values of the color patch of the one of the specific colors). As another example, to the scanner profile, the scanner profile correction section 31*e* may add lattice points, on which RGB values and color measurement values are associated with each other, on the edge of the color gamut of the printer at the time of using the scanner profile (in other words, add to the scanner profile, the RGB values and the color measurement values of the color patch of the one of the specific colors with being associated with each other, as RGB values and corresponding color measurement values indicating a color on an edge of the second color gamut).

Herein, the above-mentioned RGB value obtaining section 31*a*, color measurement value obtaining section 31*b*, scanner profile creation section 31*c*, printer gamut determination section 31*d* and scanner profile correction section 31*e* may be constituted as hardware devices. Alternatively, the above-mentioned RGB value obtaining section 31*a*, color measurement value obtaining section 31*b*, scanner profile creation section 31*c*, printer gamut determination section 31*d* and scanner profile correction section 31*e* may be provided by a program for creating a scanner profile which causes the control unit 31 to function as these sections when being executed by CPU 32. That is, the control unit 31 may be configured to serve as the RGB value obtaining section 31*a*, color measurement value obtaining section 31*b*, scanner profile creation section 31*c*, printer gamut determination section 31*d* and scanner profile correction section 31*e*, when CPU 32 executes the program for creating a scanner profile.

Printer:

The printer 40 may be an image forming apparatus, such as a MFP (Multi-Functional Peripheral), and can output a first color chart and a second color chart. The first color chart is a color chart to be used for creating a scanner profile, in which color patches are arranged such that information on the whole color gamut of a printer can be obtained. The second color chart is a color chart to be used for one of calibration of the printer, creating a printer profile, and color verification, in which color patches are arranged, where the color patches includes at least color patches in specific colors which represent the color gamut of the printer and are on the edge of the color gamut. In FIG. 1, the printer 40, the scanner 50, and the color measurement device 60 are provided as separate devices. However, as illustrated in FIG. 3, the printer 40 may be constituted to incorporate the scanner 50 and the color measurement device 60. As illustrated in FIG. 4A, the printer 40 includes a control unit 41 (a controller of the printer), a storage unit 45, a network interface (I/F) unit 46, a display and operation unit 47, an image processing unit 48 and a print processing unit 49.

The control unit 41 includes a CPU 42 and memories including a ROM 43 and a RAM 44. The CPU 42 reads out control programs stored in the ROM 43 or storage unit 45, loads the programs onto the RAM 44, and executes the programs, thereby performing the whole operations of the printer 40.

The storage unit 45 includes a HDD and/or a SSD. Storage unit 45 stores programs which, when being executed, cause the CPU 42 to control various sections of the printer 40; information about processing and functions of the printer 40; scanner profiles, printer profiles, and the others.

The network interface unit 46 includes a NIC and/or a modem. The network interface unit 46 connects the printer 40 to communication network 70 so as to be communicable with the controller 20 and the profile creation device 30.

The display and operation unit 47 is configured to display various screens relating to print processing and allows an operator to perform various operations relating to printing on the screens. Examples of the display and operation unit 47 include a touch screen in which a pressure-sensitive operation unit (a touch sensor) composed of lattice-shaped transparent electrodes is arranged on a display unit. If the printer 40 has functions of profile creation device 30, display and operation unit 47 displays various screens relating to creation and correction of a scanner profile and allows an operator to perform various operations relating to creation and correction of the scanner profile on the screens.

The image processing unit 48 is provided in the case where the printer 40 is equipped with the functions of the controller 20. The image processing unit 48 performs image processing, including color conversion, screening, and rasterization, on a job issued by the output instruction terminal 10, and transfers image data obtained after the image processing to the printing processing unit 49.

The printing processing unit (a print engine) 49 executes printing processing based on image data obtained after the image processing. In concrete terms, the printing processing unit 49 performs following processes. That is, an exposure unit performs exposure processing by irradiating a photoreceptor drum, which is charged by a charging unit, with a laser beam in accordance with an image, to form latent images on the photoreceptor drum. A developing unit develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. Further, in the case where the printer 40 is equipped with the functions of the scanner 50 and the color measurement device 60, the print processing unit 49 includes an in-line scanner 49a and an in-line color measurement device 49b.

The in-line scanner 49a includes, for example, three kinds of sensors for RGB colors and outputs RGB values obtained by the RGB sensors.

The in-line color measurement device 49b is, for example, a color measurement device supporting spectrophotometry (spectrophotometer) capable of measuring the light intensity at each wavelength, similarly to an external color measurement device. The in-line color measurement device 49b outputs color measurement values (L*a*b* values, XYZ values, etc.) with the accuracy similar to that of an external color measurement device.

In the case where the printer 40 is equipped with the functions of the profile creation device 30, as illustrated in FIG. 4B, the control unit 41 works as a scanner profile creation section 41a, a printer gamut determination section 41b and a scanner profile correction section 41c.

The scanner profile creation section 41a creates a scanner profile which associates RGB values obtained with the in-line scanner 49a by measuring a color chart (first color chart) at the time of creating the scanner profile and corresponding color measurement values obtained with the in-line color measurement device 49b by measuring the color chart (first color chart) at the time of creating the scanner profile. In this process, by using the RGB values and the color measurement values obtained, the scanner profile creation section 41a creates the scanner profile by associating RGB values and corresponding color measurement values inside or on the edge of the color gamut of the printer (in other words, RGB values and corresponding color measurement values indicating each of colors inside of the color gamut of the printer and colors on the edge of the color gamut).

As mentioned above, the printer gamut determination section 41b determines the color gamut (a first color gamut) of the printer by using one or both of the RGB values and the color measurement values of the color patches in the color chart (the first color chart) printed at the time of creating the scanner profile. Further, the printer gamut determination section 41b determines another color gamut (a second color gamut) of the printer by using one or both of the RGB values and the color measurement values of the color patches in the specific colors, which represent the color gamut of the printer and are on the edge of the color gamut, in the color chart (the second color chart) printed at the time of using the scanner profile (at the time of color conversion by using the scanner profile).

As mentioned above, the scanner profile correction section 41c compares the color gamut (the first color gamut) of the printer at the time of creating the scanner profile with the color gamut (the second color gamut) of the printer at the time of using the scanner profile, and determines the necessity of correction of the scanner profile on the basis of the comparison result. In concrete terms, on determining that the printer has the color gamut wider than the color gamut at the time of creating the scanner profile (for example, on determining that one or both of the RGB values and the color measurement values of the color patch in one of the specific colors are outside the first color gamut), the scanner profile correction section 41c determines such that it is necessary to correct the scanner profile. Then, the scanner profile correction section 41c corrects the scanner profile on the basis of the color gamut of the printer at the time of using the scanner profile. For example, the scanner profile correction section 41c may re-establish at least a part of the lattice points, on which RGB values and corresponding color measurement values are associated with each other, in the scanner profile so as to be put on the edge of the color gamut of the printer at the time of using the scanner profile (in other words, changes the RGB values and the corresponding color measurement values in the scanner profile, indicating a color closest to the one of the specific colors among colors on an edge of the first color gamut, to the RGB values and the color measurement values of the color patch of the one of the specific colors). As another example, to the scanner profile, the scanner profile correction section 41c may add lattice points, on which RGB values and color measurement values are associated with each other, on the edge of the color gamut of the printer at the time of using the scanner profile (in other words, add to the scanner profile, the RGB values and the color measurement values of the color patch of the one of the specific colors with being associated with each other, as RGB values and corresponding color measurement values indicating a color on an edge of the second color gamut).

Herein, the above-mentioned scanner profile creation section 41a, printer gamut determination section 41b and scanner profile correction section 41c may be constituted as hardware devices. Alternatively, the above-mentioned scanner profile creation section 41a, printer gamut determination section 41b and scanner profile correction section 41c may be provided by a program for creating a scanner profile which causes the control unit 41 to function as these sections when being executed by CPU 42. That is, the control unit 41 may be configured to serve as the scanner profile creation section 41a, printer gamut determination section 41b and scanner profile correction section 41c, when CPU 42 executes the program for creating a scanner profile.

It should be noted that FIG. 1 to FIG. 4B illustrate an example of the printing system of the present example, the profile creation device 30 and the printer 40, and their constitution may be modified appropriately.

Hereinafter, a description will be given to operations of the printing system of the present example. The following flow are described on the basis of the printer 40 having the construction illustrated in FIGS. 4A and 4B. A description is given on the presupposition that the printer 40 is equipped with the functions of the profile creation device 30 (that is, the control unit 41 of the printer 40 works as the scanner profile creation section 41a, the printer gamut determination section 41b, and the scanner profile correction section 41c) and the printing processing unit 49 of the printer 40 includes the in-line scanner 49a and the in-line color measurement device 49b.

First, a procedure to create a scanner profile is described. The CPU 42 reads out a program for creating a scanner profile stored in ROM 43 or storage unit 45, loads the program onto RAM 44, and executes the program, thereby performing steps of the flowchart in FIG. 5. It may be enough to perform this processing once for the first time, in other words, to perform this processing once before processing to correct the scanner profile which will be described later.

The printer 40 outputs a color chart in which color patches are arranged such that information on the whole color gamut of a printer can be obtained, with changing color materials appropriately (S101).

Next, the in-line scanner 49a of the printer 40 (or the scanner 50) scans the color chart, and obtains the RGB values of all of the color patches in the color chart (S102).

Next, the in-line color measurement device 49b of the printer 40 (or the color measurement device 60) measures colors of the color chart, and obtains the color measurement values of all the color patches in the color chart (S103).

Next, the control unit 41 (the scanner profile creation section 41a) of the printer 40 creates a color conversion table (a scanner profile) which associates the RGB values and the corresponding color measurement values of each of all the color patches in the color chart, and stores the color conversion table in the storage unit 45 (S104) In this process, as illustrated in FIG. 9B, the control unit 41 establishes RGB values in the color conversion table (the scanner profile) so that lattice points in the color conversion table are put on the edge of the color gamut (solid lines in FIG. 9B) of the printer, and associates the established RGB values with corresponding color measurement values with each other. FIG. 8 illustrates an example of the color conversion table obtained at this step.

Next, a procedure to correct the scanner profile is described. The CPU 42 reads out a program for creating a scanner profile stored in ROM 43 or storage unit 45, loads the program onto RAM 44, and executes the program, thereby steps of the flowchart in FIG. 6.

First, the control unit 41 of the printer 40 reads the scanner profile having been created from the storage unit 45 (S201). Even the scanner profile having been corrected in this flowchart may be used as the scanner profile to be read.

Next, the printer 40 outputs a color chart in which color patches are arranged (S202). FIG. 7 illustrates an example of the color chart. The pattern of the color chart 80 becomes different in accordance with a purpose to obtain color measurement values by using a scanner profile. For example, the pattern may be made as a pattern for calibration to suppress fluctuation of a printer, a pattern for creating the profile (ICC profile) of a printer, or a pattern for color verification (for check whether colors obtained after color management processing are permissively close to respective target colors). In a color chart of any of the pattern, there is a part to be measured by the in-line color measurement device 49b (color-measurement-device reading region 82), and in the part, there are arranged at least color patches in the specific colors which represent the color gamut the printer and are on the edge of the color gamut of the printer. For example, the color chart 80 includes at least eight color patches in pure colors, such as Red, Yellow, Green, Cyan, Blue, and Magenta, a white ground, and a most dark point (a mixture of four solid colors, etc.), and other color patches in colors between them may be arranged appropriately in the color chart 80.

Next, the in-line scanner 49a of the printing processing unit 49 of the printer 40 (or the scanner 50) scans the region (a scanner reading region 81) indicated with the thick broken line in the color chart 80 illustrated in FIG. 7, and obtains the RGB values of all the color patches in the region (S203).

Next, the in-line color measurement device 49b of the printing processing unit 49 of the printer 40 (or the color measurement device 60) measures colors of the region color-measurement-device reading region 82) indicated with the thick one-dot chain line in the color chart 80 illustrated in FIG. 7, and obtains the color measurement values of all the color patches in the color-measurement-device reading region 82 (for example, one line of color patches at the middle of the color chart 80) (S204).

Next, the control unit 41 (the printer gamut determination section 41b) of the printer 40 determines the color gamut of the printer (indicated with the solid line in FIG. 9B) at the time of creating the scanner profile (S205). In order to determine the color gamut of the printer at the time of creating the scanner profile, a color conversion table, as illustrated in FIG. 8, obtained by measurement of the color chart for creating the scanner profile is used. In FIG. 10 illustrating the format of the conventional ICC profile, the RGB values are prepared with regular intervals and the lattice points are not located on the edge of the color gamut of the printer, with which it is difficult to determine the accurate color gamut of the printer. In the present example, the RGB values in the color conversion table are established such that lattice points in the color conversion table are put on the edge of the color gamut of the printer. Accordingly, it becomes possible to determine the accurate color gamut of the printer by using one or both of the RGB values and the color measurement values which are written in the color conversion table.

Next, the control unit 41 (the printer gamut determination section 41b) of the printer 40 determines the current color gamut of the printer (at the time of using the scanner profile) (S206). In concrete terms, as mentioned above, in the part of the color chart 80 (color-measurement-device reading region 82 in FIG. 7) to be measured by the color measurement device 49b, there are arranged color patches in the specific colors representing the color gamut of the printer and being on the edge of the color gamut. Accordingly, the current color gamut of the printer can be determined by using one or both of the RGB values obtained by measuring the color patches in the specific colors with the in-line scanner 49a and the color measurement values obtained by measuring the color patches in the specific colors with the in-line color measurement device 49b. Herein, although it may be possible to determine the color gamut of the printer by using the RGB values, it may be preferable to use the color measurement values with which accuracy can be expected.

Next, the control unit 41 (the scanner profile correction section 41c) of the printer 40 compares the color gamut of the printer at the time of creating the scanner profile with the current color gamut of the printer (at the time of using the scanner profile), and judges whether the current color gamut of the printer is wider than that at the time of creating the scanner profile (S207). On judging that the current color gamut of the printer is thoroughly included in the color gamut of the printer at the time of creating the scanner profile, it is not necessary to correct the scanner profile.

On judging that the current color gamut of the printer is wider than the color gamut of the printer at the time of creating the scanner profile, the control unit 41 (the scanner profile correction section 41c) corrects the scanner profile (S208). In concrete terms, as illustrated in FIG. 9C, on judging that one or both of the RGB values and the color measurement values of the color patch in one of the specific colors in color chart 80 are outside the color gamut (indicated with the broken line in FIG. 9C) at the time of creating the scanner profile, the control unit 41 (the scanner profile correction section 41c) re-establishes lattice points of the scanner profile so as to be put on the edge of the current color gamut (the solid line of FIG. 9C), by the following processing. That is, the control unit 41 (the scanner profile correction section 41c) changes the RGB values and the color measurement values in the scanner profile, indicating a color (for example, the color CB on the broken line in FIG. 9C) closest to the one of the specific colors (for example, the color CA in FIG. 9C) among colors on the edge of the color gamut at the time of creating the scanner profile, to the RGB values and the color measurement values of the color patch of the one of the specific colors. Alternatively, the control unit 41 (the scanner profile correction section 41c) adds to the scanner profile the RGB values and the color measurement values of the color patch of the one of the specific colors with being associated with each other, whereby, lattice points are added to the scanner profile to be put on the edge of the current color gamut of the printer.

Performing the present processing each time at the time of using the scanner profile, makes the color gamut which allows color conversion with high accuracy wider and wider, and makes the scanner profile support various kinds of paper.

The present invention should not be limited to the above example, and the constitution and control of the system and each apparatus can be modified appropriately unless the modification deviates from the meaning of the present invention.

For example, the in-line color measurement device 49b may be an external color measurement device, and the in-line scanner 49a may be made as a flatbed scanner. However, in order to enable a scanner profile to be created and corrected with or nearby the printer 40, an in-line type device is preferable.

Further, the printer 40 may be a CMYK printer or a RGB printer, and the printer 40 may be made as an electrophotographic printer, an ink-jet printer, or an offset printer without specific limitation.

Further, in the above example, L*a*b* values in the CIE 1976 color space are exemplified as the color measurement values. However, XYZ values in the CIE 1931 color space or color appearance models such as CIECAM02 may be also used without specific limitation.

Further, in the above example, description is made for the case where the printer 40 is configured to create and correct a scanner profile. Alternatively, the control of the present invention can be applied similarly to the printing system such that the profile creation device 30 controls the printer 40, the scanner 50, and the color measurement device 60 so as to create and correct a scanner profile.

Further, in the above example, as the second color chart, color charts for calibrating a printer, for creating a printer profile, and for verifying colors are exemplified. Alternatively, the second color chart can be an arbitrary printed matter as far as it includes at least color patches in specific colors which represent the color gamut of the printer and are on the color gamut of the printer, and the constitution and arrangement of color patches of the printed matter are not limited specifically. For example, the second color chart may be made as an arbitrary printed matter including only color patches in the specific colors.

The present invention is applicable to printers, scanner-profile creation programs for creating a color conversion table (a scanner profile) of a printer, non-transitory computer-readable storage medium each storing the scanner-profile creation program and scanner-profile creating methods of creating a color conversion table (a scanner profile) of a printer.

The invention claimed is:

1. A printer comprising:
a print engine;
a scanner;
a color measurement device; and
a controller that:
    causes the print engine to print a first color chart including a plurality of color patches and a second color chart including a plurality of color patches, the plurality of color patches of the second color chart including color patches in specific colors representing a color gamut of the printer and being on an edge of the color gamut of the printer, wherein the first color chart and the second color chart are printed by the same said print engine of the same said printer,
    causes the scanner to obtain RGB values of color patches in the first color chart and the second color chart, and
    causes the color measurement device to obtain color measurement values of color patches in the first color chart and the second color chart,
wherein the controller includes:
    a scanner profile creation section that creates a scanner profile by associating the RGB values and the corresponding color measurement values of each of the color patches in the first color chart with each other,
    a printer gamut determination section that:
        determines a first color gamut of the printer by using one or both of the RGB values and the color measurement values of the color patches in the first color chart printed by the print engine of the printer and which was used by the scanner profile creation section to create the scanner profile, and
        determines a second color gamut of the printer by using one or both of the RGB values and the color measurement values of the color patches in the specific colors in the second color chart printed by the same print engine of the same printer which printed the first color chart, and a scanner profile correction section that corrects the scanner profile by comparing (i) the first color gamut of the printer which was determined using the first color chart which was used by the scanner profile creation section to create the scanner profile and (ii) the second color gamut of the printer which was determined using the second color chart printed by the same print engine of the same printer which printed the first color chart.

2. The printer of claim 1, wherein the scanner profile creation section, by using the RGB values and the color measurement values of the color patches in the first color chart, creates a scanner profile in which RGB values and corresponding color measurement values indicating each of colors inside the first color gamut and colors on an edge of the first color gamut, are associated with each other.

3. The printer of claim 1, wherein the scanner profile correction section corrects the scanner profile, on determining that one or both of the RGB values and the color measurement values of the color patch in one of the specific colors are outside the first color gamut.

4. The printer of claim 3,
wherein the scanner profile correction section corrects the scanner profile by performing one of:
changing the RGB values and the corresponding color measurement values in the scanner profile, indicating a color closest to the one of the specific colors among colors on an edge of the first color gamut, to the RGB values and the color measurement values of the color patch of the one of the specific colors, and
adding, to the scanner profile, the RGB values and the color measurement values of the color patch of the one of the specific colors with being associated with each other, as RGB values and corresponding color measurement values indicating a color on an edge of the second color gamut.

5. The printer of claim 1, wherein the first color chart is a color chart for creating the scanner profile, and the second color chart is a color chart for one of calibration of the printer, creating a printer profile of the printer and color verification.

6. The printer of claim 1, wherein the color measurement values are L*a*b* values in the CIE 1976 color space or XYZ values in the CIE 1931 color space.

7. The printer according to claim 1, wherein the scanner is an in-line scanner.

8. The printer according to claim 1, wherein the color measurement device is an in-line color measurement device.

9. A non-transitory computer-readable storage medium storing a program for creating a scanner profile to be executed in a device in a printing system including at least a printer, a scanner and a color measurement device, the device including a controller that (i) causes the printer to print a first color chart including a plurality of color patches and a second color chart including a plurality of color patches, the plurality of color patches of the second color chart including color patches in specific colors representing a color gamut of the printer and being on an edge of the color gamut of the printer, wherein the first color chart and the second color chart are printed by the same said printer, (ii) causes the scanner to obtain RGB values of color patches in the first color chart and the second color chart, and (iii) causes the color measurement device to obtain color measurement values of color patches in the first color chart and the second color chart, the program being executable by the controller of the device to cause the controller of the device to perform processing comprising:

creating a scanner profile by associating the RGB values and the corresponding color measurement values of each of the color patches in the first color chart with each other;

determining a first color gamut of the printer by using one or both of the RGB values and the color measurement values of the color patches in the first color chart printed by the printer and which was used to create the scanner profile;

determining a second color gamut of the printer by using one or both of the RGB values and the color measurement values of the color patches in the specific colors in the second color chart printed by the same printer which printed the first color chart; and correcting the scanner profile by comparing (i) the first color gamut of the printer which was determined using the first color chart which was used to create the scanner profile and (ii) the second color gamut of the printer which was determined using the second color chart printed by the same printer which printed the first color chart.

10. The non-transitory computer-readable storage medium of claim 9, wherein the creating the scanner profile includes creating, by using the RGB values and the color measurement values of the color patches in the first color chart, a scanner profile in which RGB values and corresponding color measurement values indicating each of colors inside the first color gamut and colors on an edge of the first color gamut, are associated with each other.

11. The non-transitory computer-readable storage medium of claim 9, wherein the correcting the scanner profile includes correcting the scanner profile, on determining that one or both of the RGB values and the color measurement values of the color patch in one of the specific colors are outside the first color gamut.

12. The non-transitory computer-readable storage medium of claim 11, wherein the correcting the scanner profile includes correcting the scanner profile by performing one of:
changing the RGB values and the corresponding color measurement values in the scanner profile, indicating a color closest to the one of the specific colors among colors on an edge of the first color gamut, to the RGB values and the color measurement values of the color patch of the one of the specific colors, and
adding, to the scanner profile, the RGB values and the color measurement values of the color patch of the one of the specific colors with being associated with each other, as RGB values and corresponding color measurement values indicating a color on an edge of the second color gamut.

13. The non-transitory computer-readable storage medium of claim 9, wherein the first color chart is a color chart for creating the scanner profile, and the second color chart is a color chart for one of calibration of the printer, creating a printer profile of the printer and color verification.

14. The non-transitory computer-readable storage medium of claim 9, wherein the color measurement values are L*a*b* values in the CIE 1976 color space or XYZ values in the CIE 1931 color space.

15. A method of creating a scanner profile in a printing system including at least a printer, a scanner, a color measurement device and a profile creation device, the method comprising:
printing, by the printer, a first color chart including a plurality of color patches;

obtaining, by the scanner, RGB values of color patches in the first color chart by measuring colors of the color patches in the first color chart;

obtaining, by the color measurement device, color measurement values of color patches in the first color chart by measuring colors of the color patches in the first color chart;

creating, by the profile creation device, a scanner profile by associating the RGB values and the corresponding color measurement values of each of the color patches in the first color chart with each other;

determining, by the profile creation device, a first color gamut of the printer by using one or both of the RGB values and the color measurement values of the color patches in the first color chart printed by the printer and which was used to create the scanner profile;

printing, by the printer, a second color chart including a plurality of color patches, the plurality of color patches of the second color chart including color patches in specific colors representing a color gamut of the printer and being on an edge of the color gamut of the printer, wherein the first color chart and the second color chart are printed by the same said printer;

obtaining, by the scanner, RGB values of color patches in the second color chart by measuring colors of the color patches in the second color chart;

obtaining, by the color measurement device, color measurement values of at least the color patches in the specific colors in the second color chart by measuring colors of the at least the color patches in the specific colors in the second color chart;

determining, by the profile creation device, a second color gamut of the printer by using one or both of the RGB values and the color measurement values of the color patches in the specific colors in the second color chart printed by the same printer which printed the first color chart; and correcting, by the profile creation device, the scanner profile by comparing (i) the first color gamut of the printer which was determined using the first color chart which was used to create the scanner profile and (ii) the second color gamut of the printer which was determined using the second color chart printed by the same printer which printed the first color chart.

16. The method of claim 15, wherein the creating the scanner profile includes creating, by using the RGB values and the color measurement values of the color patches in the first color chart, a scanner profile in which RGB values and corresponding color measurement values indicating each of colors inside the first color gamut and colors on an edge of the first color gamut, are associated with each other.

17. The method of claim 15, wherein the correcting the scanner profile includes correcting the scanner profile, on determining that one or both of the RGB values and the color measurement values of the color patch in one of the specific colors are outside the first color gamut.

18. The method of claim 17, wherein the correcting the scanner profile includes correcting the scanner profile by performing one of:

changing the RGB values and the corresponding color measurement values in the scanner profile, indicating a color closest to the one of the specific colors among colors on an edge of the first color gamut, to the RGB values and the color measurement values of the color patch of the one of the specific colors, and adding, to the scanner profile, the RGB values and the color measurement values of the color patch of the one of the specific colors with being associated with each other, as RGB values and corresponding color measurement values indicating a color on an edge of the second color gamut.

19. The method of claim 15, wherein the first color chart is a color chart for creating the scanner profile, and the second color chart is a color chart for one of calibration of the printer, creating a printer profile of the printer and color verification.

20. The method of claim 15, wherein the color measurement values are L*a*b* values in the CIE 1976 color space or XYZ values in the CIE 1931 color space.

* * * * *